(12) United States Patent
Bennett

(10) Patent No.: US 9,800,967 B1
(45) Date of Patent: Oct. 24, 2017

(54) SHOUT STOPPER

(71) Applicant: Jessica Bennett, Oldsmar, FL (US)

(72) Inventor: Jessica Bennett, Oldsmar, FL (US)

( * ) Notice: Subject to any disclaimer, the term of this patent is extended or adjusted under 35 U.S.C. 154(b) by 0 days.

(21) Appl. No.: 14/611,711

(22) Filed: Feb. 2, 2015

Related U.S. Application Data

(60) Provisional application No. 61/935,035, filed on Feb. 3, 2014.

(51) Int. Cl.
  *H04R 1/00* (2006.01)
  *H04R 1/10* (2006.01)
  *H04M 1/60* (2006.01)

(52) U.S. Cl.
  CPC ......... *H04R 1/1091* (2013.01); *H04M 1/6058* (2013.01); *H04R 2499/10* (2013.01)

(58) Field of Classification Search
  CPC ............. H04R 1/1091; H04R 2499/11; H04M 1/0258; H04M 1/0274; H03G 3/32
  USPC ..... 381/71.6, 74, 56, 58, 370, 376; 455/570, 455/575.2
  See application file for complete search history.

(56) References Cited

U.S. PATENT DOCUMENTS

| | | | |
|---|---|---|---|
| 2004/0179694 A1* | 9/2004 | Alley | 381/55 |
| 2005/0130697 A1* | 6/2005 | Dyer | H04M 1/6058 455/550.1 |
| 2005/0288067 A1* | 12/2005 | Wainwright | H04M 19/04 455/567 |
| 2008/0089530 A1* | 4/2008 | Bostick et al. | 381/74 |

* cited by examiner

*Primary Examiner* — Sunita Joshi
(74) *Attorney, Agent, or Firm* — Nicholas Pfeifer; Smith & Hopen, P.A.

(57) ABSTRACT

The present invention includes a system for alerting a headphone user that another individual is attempting to gain the user's attention. The system includes an alert receiver designed to easily mate with the headphones and an audio source. The alert receiver wirelessly communicates with an alert transmitter that can be manually operated by the individual. This system enables an individual to easily alert the headphone user without requiring either party have or use a telephone.

17 Claims, 3 Drawing Sheets

SHOUT STOPPER

CROSS-REFERENCE TO RELATED APPLICATIONS

This nonprovisional application is a continuation of and claims priority to provisional application No. 61/935,035, entitled "SHOUT STOPPER," filed Feb. 3, 2014 by the same inventor.

BACKGROUND OF THE INVENTION

1. Field of the Invention

This invention relates, generally, to an alerting device. More specifically, it relates to a headphone adapter designed to alert a headphone user or more than one headphone users when another individual is attempting to communicate with the headphone user(s).

2. Brief Description of the Prior Art

In this day and age, audio devices and headphones have become common accessories. While many benefits stem from headphones, issues have arisen in communicating with individuals using headphones. The party attempting to communicate with a headphone user is often unable to gain the attention of the headphone user due to headphones' inherent ability to block out external noise by transmitting audio. Resultantly, the communicating party is forced to gain the user's attention through shouting, visual contact, or physical contact, which could easily annoy either party.

Currently, there exists technology to gain the attention of headphone users when they are receiving an incoming phone call, such as U.S. patent application Ser. No. 11/165,887 to Wainwright. However, this technology is designed to inform a headphone user when he/she is receiving a phone call. It does not enable an individual to gain the attention of a headphone user without calling the headphone user's cellular telephone.

Accordingly, what is needed is a simple and inexpensive system adapted to enable an individual to gain the attention of a headphone user without either party having to use a cell phone. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for a simple and inexpensive system adapted to enable an individual to gain the attention of a headphone user without either party having to use a cell phone is now met by a new, useful, and nonobvious invention.

The novel structure includes an alert receiver and an alert transmitter. The alert receiver having a female connection port adapted to mate with an audio output device and a male input adapted to mate with an audio source, such that an audio output path exists between the audio output device and the audio source. The alert receiver also includes a receiving module in communication with an alerting module.

The alert transmitter has a manually triggered activator that causes the transmission of a wireless signal, preferably through a predetermined radio frequency, when triggered. The receiving module is adapted to receive the wireless signal from the alert transmitter and communicates the receipt to the alerting module, which in turn alerts the user of the audio output device.

The audio output device is preferably a pair of headphones and the alerting module preferably alerts the user of the audio output device by temporarily cutting the connection of the audio output path between the audio output device and the audio source. In a certain embodiment, the alerting module alerts the user of the audio output device by passing a tone to the user through the audio output path. In another embodiment, the alert transmitter may be adapted to record voice input and relay a signal to the alert receiver containing the recorded voice input, such that the alert receiver alerts the headphone user with the recorded voice input.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

The present invention provides a system for alerting a user, listening to an audio output generated from an audio source, that another individual is attempting to get the user's attention. The present invention provides an alternative alerting system that can be used without a cell phone for situations such as a parent trying to get a child's attention when the child is listening to headphones in another room. This is a simple and inexpensive alternative to the existing technology requiring another individual to call the headphone user's phone before the technology sends an alert to the headphone user. The alert may include, but is not limited to, an interruption in the audio signal to the audio output, a reduction in the volume of the audio output, and/or a low-level tone that occurs over top the audio output or in place of the audio output. The audio source may include any device known to a person having ordinary skill in the art that transmits audio and the audio output may include any device known to a person having ordinary skill in the art capable of outputting audio.

The present invention includes an alert transmitter and an alert receiver adapted to communicate with one another. The alert receiver is designed to communicate with the audio output device, such as headphones, to alert the user of the audio output device that another individual is attempting to communicate with the user.

Example

Figure 1:
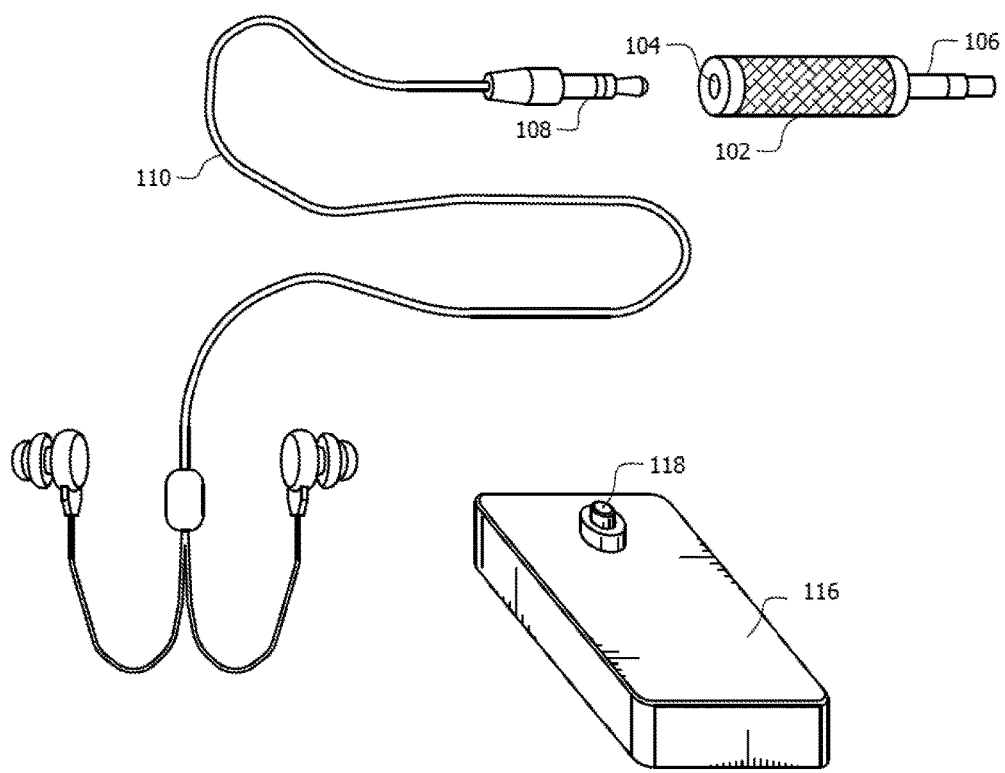
FIG. 1 is a perspective view of a certain embodiment of the present invention showing the female jack of the alert receiver in alignment with the male jack of a pair of headphones.
Figure 2:
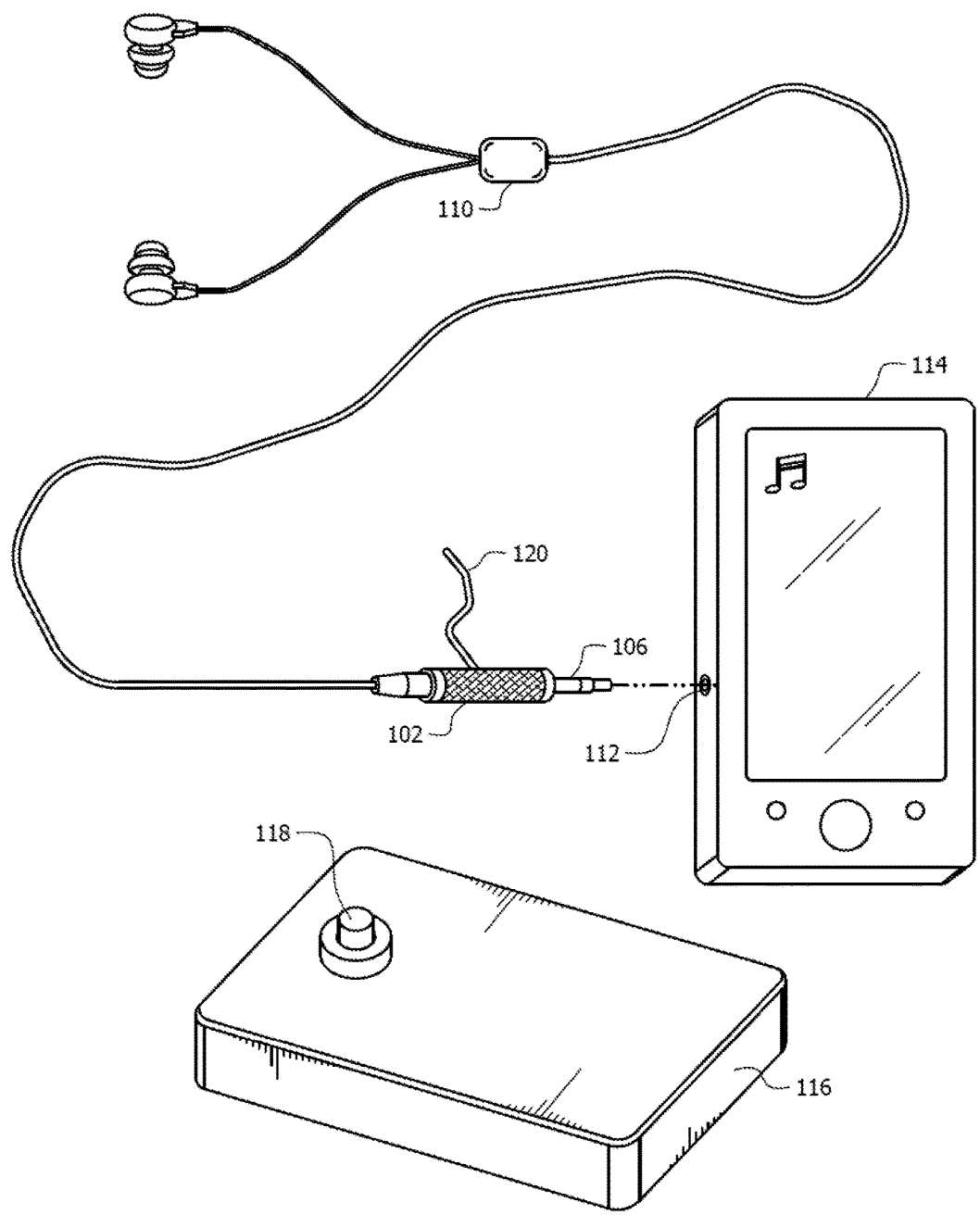
FIG. 2 is a perspective view of a certain embodiment of the present invention showing the alert receiver mated with the headphones and in alignment with an audio source.

As shown in FIG. 1, a certain embodiment includes alert receiver 102 having a female connection port or female jack 104 and a male input or male jack 106. Female jack 104 is adapted to mate with male input or male jack 108 from headphones 110. Male jack 106 of alert receiver 102 is adapted to mate with female jack 112 of audio source 114 as shown in FIG. 2. The abovementioned connections provide an audio output path starting at audio source 114, passing through alert receiver 102, and to headphones 110. In a certain embodiment, female jack 104 and male jack 106 are each in a standard 3.5 mm headphone/stereo plug format.

Figure 3:
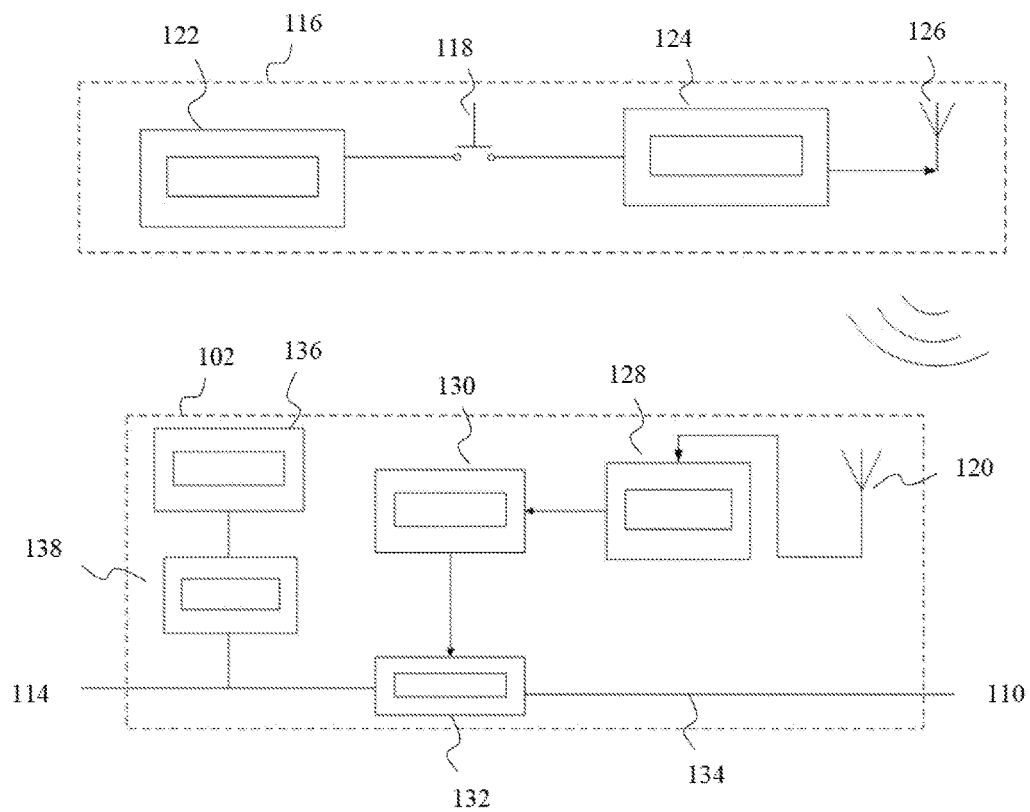
FIG. 3 is an exemplary diagram of the schematics of the alert transmitter and the alert receiver.

Alert transmitter 116 includes activator 118 in the form of a button, which activates a wireless communication receivable by alert receiver 102. As shown in FIG. 3, alert transmitter 116 is adapted to wirelessly communicate with alert receiver 102 when activator 118 is initiated. Activator 118 is a momentary switch designed to complete the circuit between power source 122 and radio frequency transmitter 124. The completion of the circuit enables radio frequency transmitter 124 to emit the predetermined signal from transmitting antenna 126.

Alert receiver 102 includes a receiving module 128 in communication with receiving antenna 120. Receiving module 128 may include but is not limited to a radio receiver tuned to a specific frequency, a Bluetooth radio receiver, or an 802.11 radio receiver. Receiving module 128 is adapted to receive the particular signal sent via alert transmitter 116.

Alert receiver 102 further includes alerting controller 130 that communicates with receiving module 128 and controls alerting module 132. Alerting module 132 is adapted to interrupt the audio output path 134 and cut the sound from the audio source to headphones 110. In a certain embodiment, alerting module 132 may include a circuit to generate a low-level tone. Alert receiver 102 also contains power source 136 and power-saving circuit 138 to trigger a sleep mode when headphones 110 are not receiving an audio signal from audio source 114. In another embodiment, alert receiver 102 may rely on power received through the connection to audio source 114.

Depending on the type of receiving module employed by alert receiver 102, alert transmitter 116 communicates with alert receiver 102 through a corresponding signal via radio frequency, Bluetooth, or 802.11. In a certain embodiment, alert receiver 102 and/or alert transmitter 116 may include circuitry to enable LAN, WAN, or internet based communications.

Alert receiver 102 is an intermediate connection between audio source 114 and headphones 110, maintaining the audio path connection 134. When receiving module 120 receives a wireless signal from alert transmitter 116, an electronic signal is sent to alerting module 130 and an alert is passed to headphones 110 user through audio output path 134. In a certain embodiment, the alert receiver may connect with the headphones and/or the audio output device as an adjacent connection and not as a direct line through the audio output path.

In a certain embodiment, the alert may remain consistent during the time period in which the alert receiver 102 is receiving a transmission from the alert transmitter 116. Thus, the operator of alert transmitter 116 can maintain the alert for a desired period of time by continuing to engage activator 118. In another embodiment, the alerting module in the alert receiver 102 may include a component, known to a person having ordinary skill in the art, that is adapted to initiate the alert for a predetermined period of time after receiving a transmission from alert transmitter 116. In a certain embodiment, alert transmitter 116 may include a component, known to a person having ordinary skill in the art, that enables alert transmitter 116 to continuously transmit the signal to alert receiver 102 for a predetermined amount of time after activator 118 has been triggered.

Such an embodiment would also include the alerting module in alert receiver 102 maintaining the alert while continuing to receive communications from alert transmitter 116.

In a certain embodiment, a single alert transmitter may be adapted to alert a plurality of alert receivers all at once and/or one at a time. This embodiment would be particularly useful for situations such as a classroom teacher using one button to trigger an alert for multiple students' headsets. In another embodiment, the alert transmitter may include several triggers wherein each trigger is adapted to communicate with a certain receiver or subset of receivers.

GLOSSARY OF CLAIM TERMS

Alert Receiver: is a device capable of receiving a signal.
Alert Transmitter: is a capable of transmitting a signal.
Alert: is any intentional noticeable change in the status quo.
Audio Output Device: is a device capable of transmitting audio waves.
Headphones: is any sound producing device adapted to sit on, in, or near a person's ear or ears.
Receiving Module: is a device adapted to receive a signal.
Signal: is an electrical impulse or radio wave transmitted or received.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A system for alerting a user of an audio output device, comprising:
   a handheld remote alert transmitter having a manually actuated switch, wherein the actuation of the switch causes the transmission of a predetermined wireless signal through an antenna;
   an alert receiver that is independent from the alert transmitter, wherein the alert receiver further includes:
      a female connection port adapted to mate with an audio output device and a male input adapted to mate with an audio source such that an audio output path exists between the audio output device and the audio source;
      a receiving module in communication with an alerting module; and
      the receiving module adapted to receive the wireless signal from the alert transmitter through a receiving antenna, wherein the receiving module communicates to the alerting module when the receiving module receives the wireless signal from the alert transmitter and the alerting module in turn alerts the user of the audio output device.

2. The system of claim 1, wherein the audio output device is a pair of headphones.

3. The system of claim 1, wherein the alerting module alerts the user of the audio output device by temporarily cutting the connection of the audio output path between the audio output device and the audio source.

4. The system of claim 1, wherein the alerting module alerts the user of the audio output device by passing a tone to the user through the audio output path.

5. The system of claim 1, wherein the wireless signal may be transmitted through a predetermined radio frequency.

6. The system of claim 1, wherein the alerting module maintains the alert for a predetermined time.

7. The system of claim 1, wherein the alerting module maintains the alert until the manually actuated switch on the transmitter is disengaged.

8. A system for alerting a headphone user, comprising:
   a handheld remote alert transmitter having a manually actuated switch, wherein the actuation of the switch causes the transmission of a predetermined wireless signal through an antenna;
   an alert receiver that is independent from the alert transmitter, wherein the alert receiver further includes:
      a female connection port adapted to mate with the headphones and a male input adapted to mate with an audio source such that an audio output path exists between the headphones and the audio source;
      a receiving module in communication with an alerting module;
      the receiving module adapted to receive the wireless signal from the alert transmitter through a receiving antenna, wherein the receiving module communicates to the alerting module when the receiving module receives a wireless signal and the alerting module in turn alerts the user of the headphones; and
      the alerting module maintaining the alert until the transmission of the wireless signal ceases.

9. The system of claim 8, wherein the alerting module alerts the headphone user by temporarily cutting the connection of the audio output path between the headphones and the audio source.

10. The system of claim 8, wherein the alerting module alerts the user of the headphones by passing a tone to the user through the audio output path.

11. The system of claim 8, wherein the wireless signal may be transmitted through a predetermined radio frequency.

12. The system of claim 8, wherein the alerting module maintains the alert for a predetermined time.

13. A system for alerting a user of an audio output device, comprising:
   an alert receiver that is independent from a remote alert transmitter, wherein the alert receiver further includes
      a female connection port adapted to mate with the audio output device and a male input adapted to mate with an audio source such that an audio output path exists between the audio output device and the audio source;
      a receiving module in communication with an alerting module;
   the remote alert transmitter having a manually triggered activator, wherein the activator causes the transmission of a wireless signal through an antenna when triggered; and
   the receiving module adapted to receive the wireless signal from the alert transmitter through a receiving antenna, wherein the receiving module communicates to the alerting module when the receiving module receives a wireless signal and the alerting module in turn alerts the user of the audio output device.

14. The system of claim 13, wherein the alerting module alerts the user of the audio output device by temporarily cutting the connection of the audio output path between the audio output device and the audio source.

15. The system of claim 13, wherein the alerting module alerts the user of the audio output device by passing a tone to the user through the audio output path.

16. The system of claim 13, wherein the alerting module maintains the alert for a predetermined time.

17. The system of claim 13, wherein the alerting module maintains the alert until the transmission of the wireless signal ceases.

* * * * *